June 5, 1945. H. A. WEXELL ET AL 2,377,534
APPARATUS FOR SHAPING GLASS ARTICLES
Filed Jan. 23, 1942 2 Sheets-Sheet 1

Inventors
ARCHIBALD H. MACLAREN
AND HAROLD A. WEXELL
BY F. H. Knight
Attorney

June 5, 1945.  H. A. WEXELL ET AL  2,377,534
APPARATUS FOR SHAPING GLASS ARTICLES
Filed Jan. 23, 1942  2 Sheets-Sheet 2
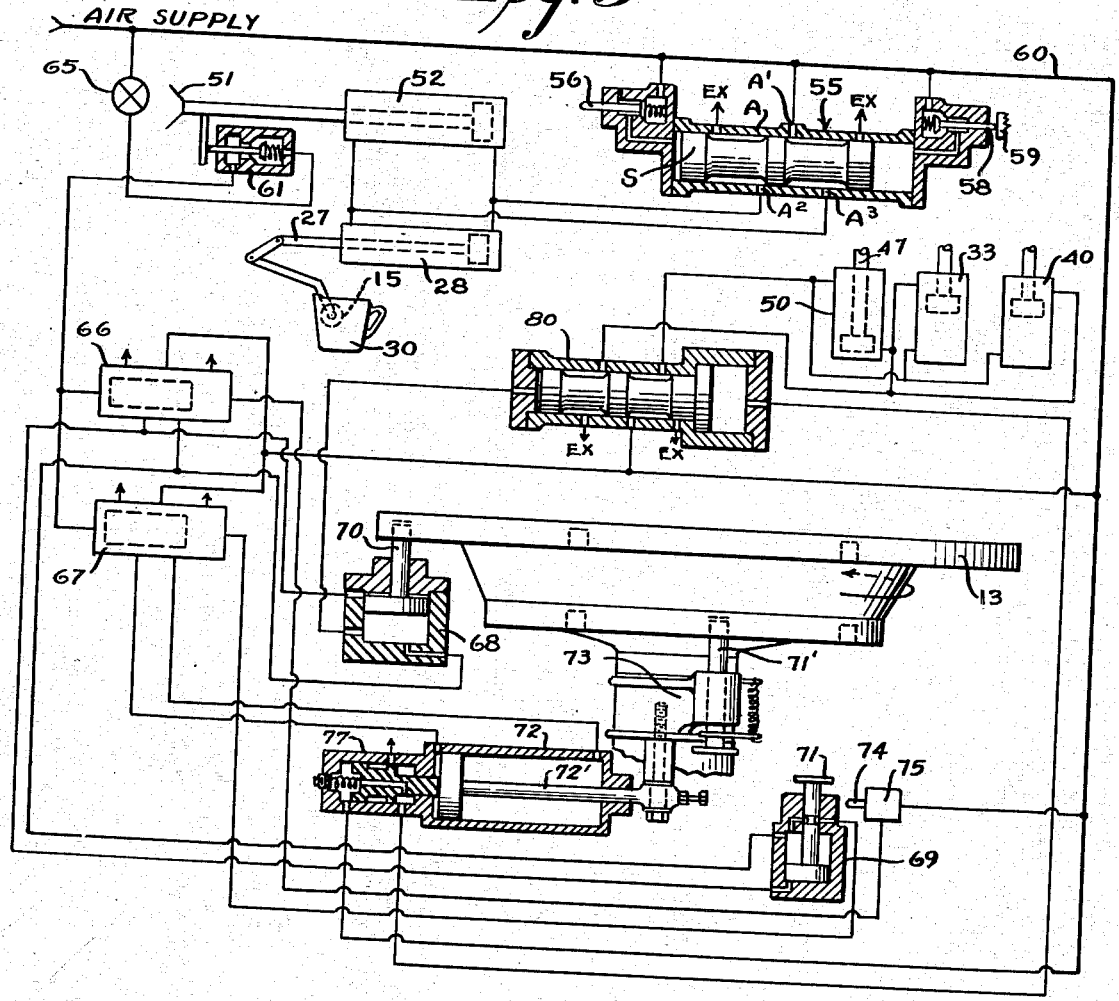
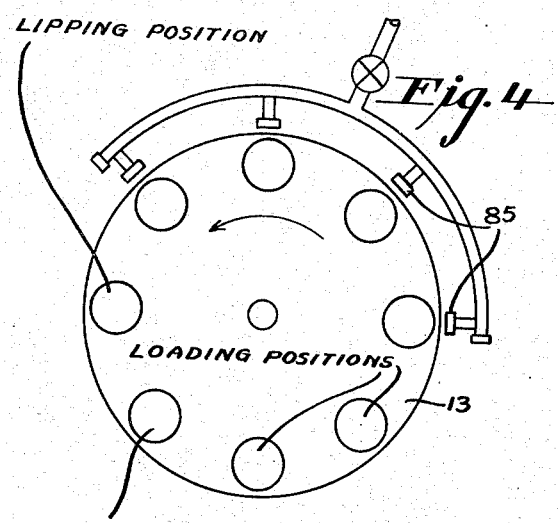
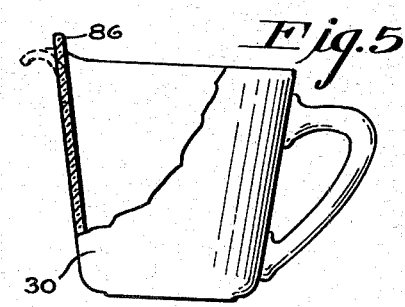
Inventors
ARCHIBALD H. MACLAREN
AND HAROLD A. WEXELL
By F. H. Knight
Attorney Patented June 5, 1945

2,377,534

UNITED STATES PATENT OFFICE 2,377,534

APPARATUS FOR SHAPING GLASS ARTICLES

Harold A. Wexell and Archibald H. MacLaren, Corning, N. Y., assignors to Corning Glass Works, Corning, N. Y., a corporation of New York Application January 23, 1942, Serial No. 428,002

7 Claims. (Cl. 49—7)

The present invention relates to apparatus for shaping glass, and in particular to means for altering the shape of a desired portion or portions of articles which have been given a preliminary shape.

The prime object of the present invention is the production of reshaped articles of improved quality.

Another object of the present invention has to do with an improved form of apparatus for the reshaping of glass articles.

The invention embodies among its features facilities for progressively heating parts of a plurality of articles to be reshaped, successively bringing the reheated articles to a reshaping position, imparting the desired shape to each article at such position, advancing a reshaped article to an unloading position as another article is being associated with the reshaping apparatus and finally unloading the reshaped article as the reshaping of another article is being effected.

The invention has herein been embodied in a structure suitable for forming no-drip pouring lips on measuring cups and the like.

Fig. 1 of the accompanying drawings is a plan view of a fragment of a machine embodying the invention;

Fig. 3 is a piping diagram of the machine;

Fig. 4 is a plan view diagrammatically illustrating equipment for heating portions of articles and the positions at which the loading, heating, lipping and unloading occur; and Fig. 5 is a side elevation partly in section, of a cup before the same has been lipped.

Figure 1:
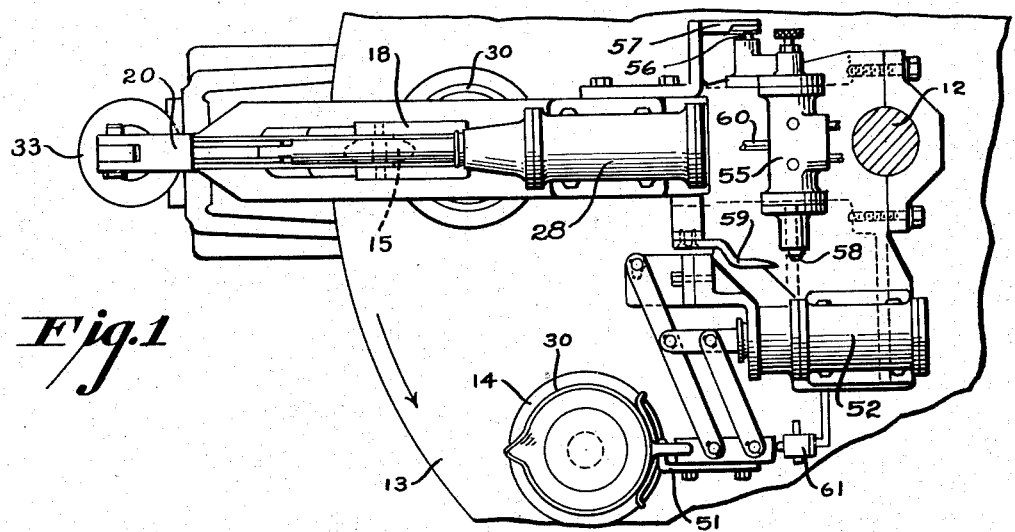
Figure 2:
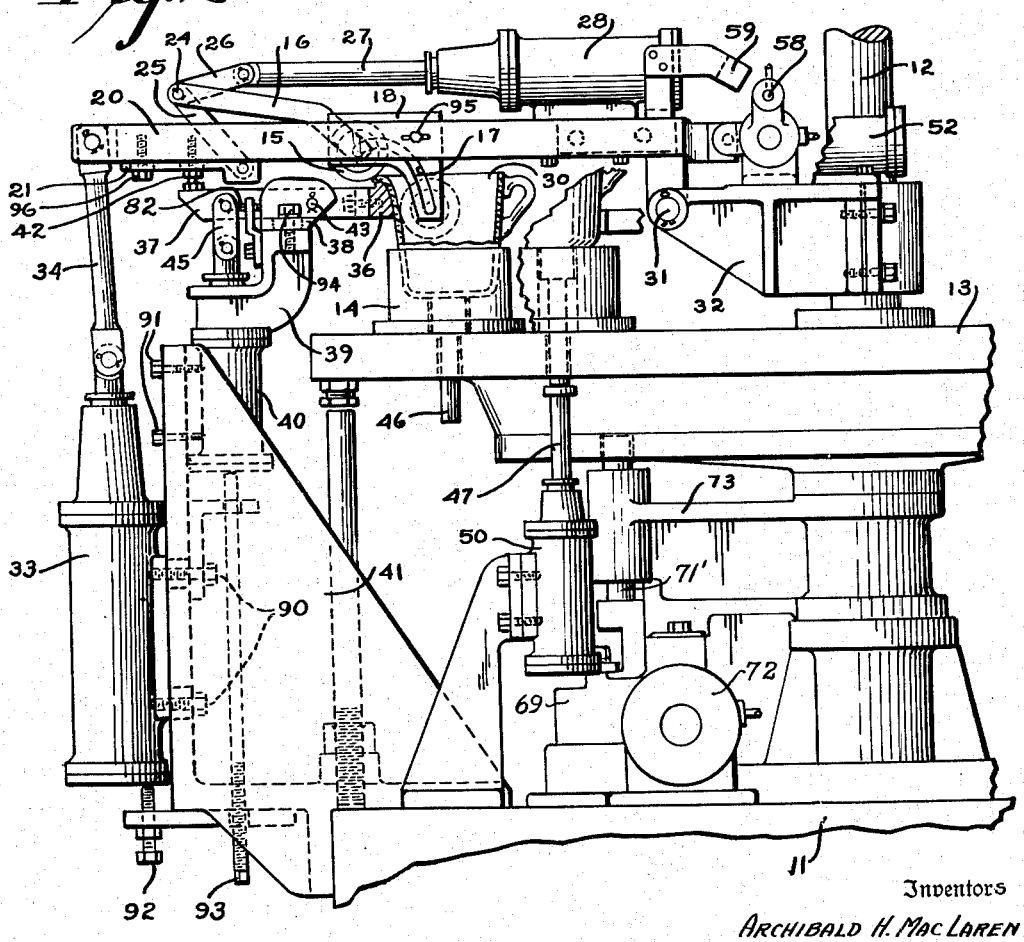
Fig. 2 is a side elevational view of Fig. 1.

Referring now to Figs. 1 and 2, the operating parts of the apparatus are carried by a base 11 and by a fixed vertical shaft 12 which passes through the axial center of a rotatable table 13 having ware holders 14 arranged about its periphery. The table 13 is arranged for rotation in step-by-step fashion as required to successively index holders 14 under a lipping mechanism comprising a lipping roller 15 carried by an axle passing through one end of a link 16 and through a cam slot 17 in a cam plate 18 adjustably fixed to a lipping mechanism support 20. The other end of link 16 is coupled to the common pivot pin 24 joining the adjacent ends of two levers 25 and 26. The opposite end of lever 25 is pivoted to a bracket 21 also adjustably fixed to support 20, whereas the opposite end of lever 26 is coupled to the drive rod 27 of a pneumatic power unit 28 also fixed to support 20. The arrangement is such that the power unit 28 is enabled to move the forming roller back and forth over the path afforded by slot 17 which is made to correspond to the outline it is desired to impart to the inner surfaces of the lips to be formed in articles 30.

To bring the forming roller into lipping relation with an article 30 and to move the roller clear of the article after it is lipped the support 20 has one end pivoted at 31 to a bracket 32 supported on shaft 12 and has its other end attached to a link 34 connected with the drive rod of a pneumatic power unit 33 adjustably secured to a bracket 41 attached to the base 11.

When forming a no-drip form of lip, particularly on heavy walled ware such as shown, consistent desired results can best be obtained by providing a mold, such as mold 36, to control the outer contour of the lip although such a mold is not absolutely essential. This mold is mounted on a bar 37 pivoted at 43 to a bracket 38 adjustably secured to a fixed support 39 attached to a pneumatic power unit 40. The unit 40 is in turn adjustably fixed to the bracket 41. The bar 37 near the end opposite mold 36 is connected to a drive rod of unit 40 by a link 45, enabling the unit 40 to move the bar about its pivot 43 to bring mold 36 into and out of association with the article. To make positive that mold 36 is brought in the exact position desired relative to the lipping mechanism, a cap screw 42 is threaded into the under side of support 20 in position to engage bar 37 when support 20 is in its down position.

Each article holder 14 is provided with an unloading valve 46 which becomes positioned over the drive rod 47 of a ware lifting pneumatic power unit 50 adapted to lift one lipped article clear of its holder while units 33 and 40 are being operated to associate roller 15 and mold 36 with another article to be lipped. A push out device 51 equipped with a pneumatic power unit 52 is arranged to move the lifted article onto a suitable conveyer (not shown) while the pneumatic unit 28 is operating the lipping mechanism. Although device 52 is shown in the retracted position in Fig. 1, under operating conditions it is advanced to the forward position as unit 28 advances roller 15 to the forward position, as will be fully brought out hereinafter. Air for operating power units 28 and 52 is supplied through a control valve 55. Valve 55 (Figs. 1 and 3) is of conventional design comprising a cylinder A having exhaust apertures EX, an air inlet aperture A' connected to an air pressure line 60 and apertures $A^2$ and $A^3$ through one or the other of which the valve supplies operating air to one end of units 28 and 52 and through the remaining one of which it exhausts the other end of the units to atmosphere through one of the apertures EX under control of a spool S shifted back and forth in cylinder A by air supplied through passages in the ends of cylinder A. This latter air supply is through simple spring return poppet valves having operating extensions or buttons 56 and 58 actuated by cams 57 and 59 attached to support 20. In Fig. 1 support 20 is shown in the down position with cam 57 depressing button 56, whereas in Fig. 3 the support 20 is assumed to be in the up position with cam 59 holding button 58 depressed.

The table indexing and locking mechanism is of well known form and in brief comprises a pneumatic rotator unit 72 having a piston actuated drive rod 72' linked to a table indexing arm 73 provided with a table drive pin 71' adapted to enter apertures on the underside of table 13 under the influence of an associated spring when the piston of unit 72 is in a retracted position. When the table has been indexed a pull-down unit 69 having a piston actuated pull-down rod 71 is arranged to withdraw drive pin 71' from driving relation with the table so as to enable unit 72 to retract arm 73 preparatory to a subsequent indexing movement. Operation of unit 72 is through a main operating valve 67 which is similar to valve 55. The table is locked against rotation by a pneumatic table locking unit 68 operated in multiple with unit 69. Operations of units 68 and 69 are by air supplied through a trip table lock valve 66 which is also similar to valve 55. Air is supplied to the left ends of valves 66 and 67 from the main air supply line 60 via valves 65 and 61. When air is supplied to the left end of valve 66 it is actuated to supply air to unit 68 to lower lock pin 70 and to unit 69 to raise pull-down rod 71. When air is supplied to the left end of valve 67 it is likewise actuated to supply air to unit 72 to perform an indexing movement. Valve 66 is actuated to supply air to unit 68 to raise its pin 70 to lock the table and to unit 69 to restore pull-down rod 71 to the lowered position by air supplied to the right end of the valve through a valve 75, in a branch of line 60, actuated by rod 72' at the completion of an indexing movement. Valve 75 is similar to valve 61. Valve 67 is actuated to supply air to unit 72, to retract its piston, by air supplied to the right end of the valve through a passage in unit 69 established by lowering of pull-down rod 71.

Units 33, 40 and 50 are adapted to be operated in unison by air supplied through a differential plunger control valve 80. Actuation of valve 80 to supply air to raise the pistons of units 33 and 40 to disassociate the support 20 and mold 36 from a lipped article 30 and application of air to unit 50 to lower the ware raising rod 47 is by means of air supplied through a piston valve 77 adapted to be opened against spring tension by the piston of table rotator unit 72 as the piston reaches its retracted position. Actuation of valve 80 to supply air to effect the reverse movement of the pistons of units 33, 40 and 50 is by means of air supplied through the cylinder of table locking unit 68 when the piston of such unit is raised to lock the table.

In Fig. 3 the various units are indicated as being in the positions they assume at the termination of an operating cycle which has resulted from valve 65 being in the closed position. For the purpose of describing the operation it will be assumed that control valve 65 is opened to supply air for initiating an operating cycle. The valve 65 may be operated manually or if preferred under control of suitable timing equipment. Irrespective of the manner of operation air is supplied to the left end of the trip table lock valve 66 and also to the left end of main operating valve 67. Valve 66 is shifted to supply air to table lock and pull down units 68 and 69 as required to lower the table lock pin 70 to enable movement of the table 13 and to raise the pull down 71. The main operating valve 67 shifts to supply air to table rotator 72 to perform its indexing operation. At the end of its forward stroke its rotator arm 73 strikes button 74 of a valve 75 which then supplies air to the right hand end of valve 66 so that the same shifts to again supply air to units 68 and 69 to raise the table lock pin 70 to lock table 13 and to lower the pull down 71 to disengage the drive pin 71' from the table. With pull down 71 in the lowered position it allows air to be supplied to the right end of main operating valve 67 enabling it to supply air to the right end of rotator unit 72 to effect its back stroke. With the lock pin 70 in its raised position unit 68 supplies air to the left end of valve 80. Valve 80 shifts to supply air to the upper ends of units 33 and 40. Unit 33 accordingly lowers support 20 to bring the lipping roller 15 into association with the next article 30 to be lipped and unit 40 swings bar 37 as required to bring the mold 36 into association with the article. Valve 80 also supplies air to the lower end of unit 50 causing it to move its rod 47 to raise the article 30 at the unloading position above its holder. As the support 20 arrives at its lowered position arm 57 actuates trip button 56 to shift valve 55 to supply air to the rear ends of units 28 and 52 to cause these units to perform the lip forming and unloading functions.

At the end of the back stroke the rotator 72 passes air to the right end of trip valve 80 to cause it to shift and supply air to unit 33 to raise support 20 and thus disassociate the forming mechanism from the formed article 30, to supply air to unit 40 to lower mold 36 clear of the article lip, and to supply air to unit 50 to lower rod 47 and thus permit the article raising valve 46 to be again seated in its holder.

As the support 20 arrives at its raised position arm 59 engages button 58 to trip valve 55 to its left position to cause it to supply air to the front ends of units 28 and 52 to operate them to restore their respective mechanisms. As previously stated restoration of the ware pusher mechanism opens valve 61 thereby initiating a new cycle of operation or at least conditioning the system for initiation of a cycle by actuation of valve 65.

As illustrated in Fig. 4 the proper heating of the portion of the articles to be lipped comprises suitable burners 85 arranged at a successive number of positions between the loading and lipping positions.

In the previous description mention has been made of the fact that units 33 and 40 were adjustably supported. This is made possible by loosening their holding screws 90 and 91 which pass through slotted apertures of bracket 41, and then actuating adjusting screws 92 or 93 to suitably regulate the height of the units. Lateral adjustment of the mold 36 is similarly made possible by loosening its holding screw 94 and suitably turning an adjusting screw 82. Slotted apertures through plate 18 and bracket 21 and through which their holding screws 95 and 96 pass enable lateral adjustment of these brackets relative to support 20. These adjustable features enable a considerable latitude in the form of lip produced and the making of adjustments for different thicknesses of ware handled.

It is ordinarily the practice in lipping operations to simply stretch the article wall to produce the lip. By such method of lip forming, the glass of the lip and that adjoining the opposite sides of the lip is likely to be thinner and therefore weaker than the remainder of the article wall. To overcome this applicants prefer to form a cup with an extension of material 86 to be employed in forming the lip, as illustrated in Fig. 5. By providing the additional material 86 from which to form the lip the former is not required to draw glass away from the sidewall but instead merely is required to pull down the specially provided glass to the shape desired. A stronger lip is accordingly produced and weakening of the adjoining wall avoided. Also the capacity of the cup is not reduced as is the case when the lip is formed in a cup of uniform wall height.

Although in the foregoing there has been shown and described the preferred embodiment of our invention, it is to be understood that minor changes in the details of construction and combination of parts may be resorted to without departing from the spirit and scope of our invention as claimed.

What is claimed is:

1. In a glass working apparatus, a movable support, a lipping mechanism comprising a plate fixed to said support and with a slot therethrough of a contour of the outline of pouring lip channel desired, an axle passing transversely through said slot, a lip forming roller supported by said axle, an operating link through which said axle passes, means for moving said support to bring said plate in such position relative to a suitably heated portion of an article that movement of said roller from one end of the slot to the other will form a lip on the heated portion of the article, and means for actuating said link to move said roller from one end of the slot to the other.

2. In a glass working apparatus, a movable support, a lipping mechanism comprising a plate fixed to said support and with a slot therethrough of a contour of the outline of pouring lip channel desired, an axle passing transversely through said slot, a lip forming roller supported by said axle, an operating link through which said axle passes, means for moving said support to bring said plate in such position relative to a suitably heated portion of an article that movement of said roller from one end of the slot to the other will form a lip on the heated portion of the article, a mold for determining the shape to be imparted to the outer surface of the lip, means for moving said mold adjacent the outer surface of the heated portion of the article, and means for actuating said link to move said roller from one end of the slot to the other.

3. In a glass working apparatus, a movable support, a lipping mechanism comprising a plate fixed to said support and with a slot therethrough of a contour of the outline of pouring lip channel desired, an axle passing transversely through said slot, a lip forming roller supported by said axle, an operating link through which said axle passes, means for moving said support to bring said plate in such position relative to a suitably heated portion of an article that movement of said roller from one end of the slot to the other will form a lip on the heated portion of the article, a mold for determining the shape to be imparted to the outer surface of the lip, means for moving said mold adjacent the outer surface of the heated portion of the article, means associated with said support for establishing a desired relationship between said mold and roller, and means for actuating said link to move said roller from one end of the slot to the other.

4. In a glass working apparatus, a movable support, a lipping mechanism comprising a plate fixed to said support and with a slot therethrough of a contour of the outline of pouring lip channel desired, an axle passing transversely through said slot, a lip forming roller supported by said axle, an operating link attached to said axle, means for moving said support to bring said plate in such position relative to a suitably heated portion of an article that movement of said roller from one end of the slot to the other will form a lip on the heated portion of the article, and means under control of said support and support moving means for actuating said link to move said roller from one end of the slot to the other.

5. In a mechanism suitable for forming a lip on a previously heated wall portion of a glass container, a movable support, a plate associated with said support having a slot therethrough, a forming mechanism carried by said support including a forming roller, an axle for said roller passing transversely through said slot, means for moving said support as required to bring one end of said slot into such position with respect to the heated portion of the article that by movement of the axle from said one end of the slot to the other the roller will be wheeled over the article surface in a manner to impart thereto a lip of an outline corresponding to that of said slot, and means for moving said axle from one end of the slot to the other.

6. In an apparatus for shaping a pouring lip in the top of the sidewall of an open topped container, means for heating that portion of the container to be lipped, a roller, means providing a path of movement for said roller corresponding to the outline it is desired to impart to the channel of the lip to be formed, mechanism for moving said roller into the interior of a piece of ware and adjacent the heated portion thereof, and mechanism for moving said roller over said path for the purpose set forth.

7. In a glass working apparatus, a rotatable table, a series of article holders arranged in equally spaced relation about the peripheral surface of said table, a movable support arranged over said table, a lip forming mechanism carried by said support, means for rotating said table in a step-by-step fashion to successively bring said holders under said lip forming mechanism, a power unit for moving said support to associate said lip forming mechanism with an article thereunder, and means actuated by said support, as it associates said lip forming mechanism with an article, to effect the actuation of said lip forming mechanism.

HAROLD A. WEXELL.
ARCHIBALD H. MacLAREN.